T. RITCHIE.
STOCK WATERER.
APPLICATION FILED JAN. 16, 1922.
1,433,477. Patented Oct. 24, 1922.
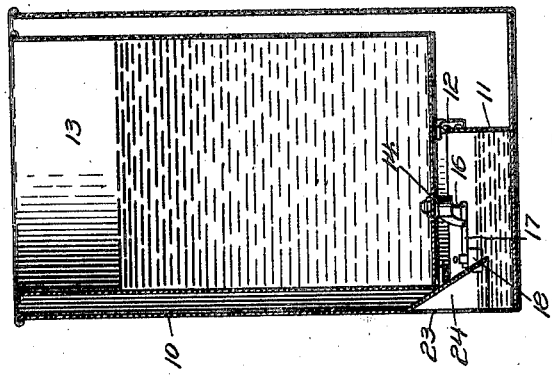
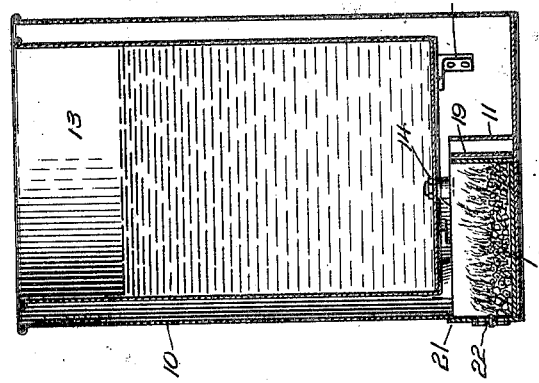
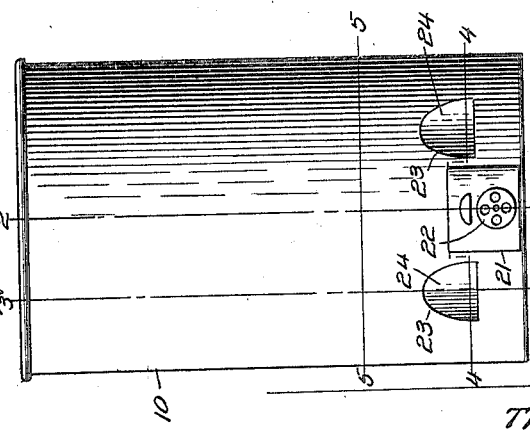
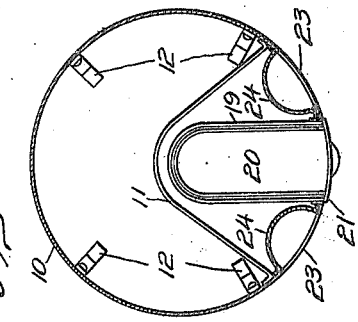
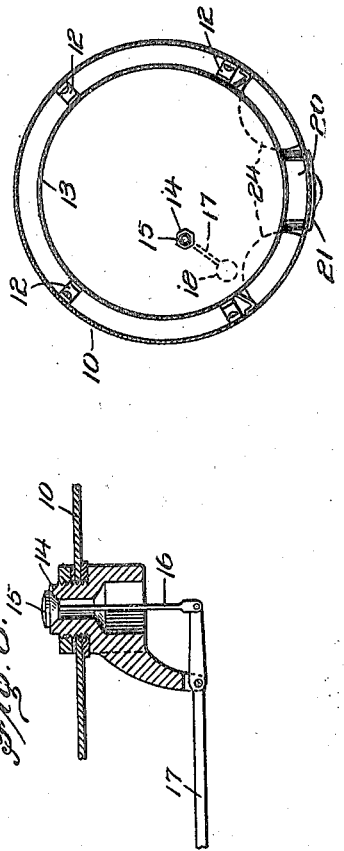
INVENTOR.
Thomas Ritchie.
BY
Geo. P. Kimmel
ATTORNEY.

Patented Oct. 24, 1922.

1,433,477

UNITED STATES PATENT OFFICE.

THOMAS RITCHIE, OF OSKALOOSA, IOWA.

STOCK WATERER.

Application filed January 16, 1922. Serial No. 529,540.

*To all whom it may concern:*

Be it known that I, THOMAS RITCHIE, a citizen of the United States, residing at Oskaloosa, in county of Mahaska and State of Iowa, have invented certain new and useful Improvements in Stock Waterers, of which the following is a specification.

This invention relates to stock watering devices, and has for one of its objects to simplify and improve the construction and increase the efficiency and utility of devices of this character.

Another object of the invention is to provide a device of this character including a watering pan, a compartment within the pan to contain a heat imparting medium, a watering tank to replenish the water in the pan, openings for the noses of the animals to reach the water in the pan and protected by internal "hoods", and means for automatically replenishing the pan as fast as it is consumed, and no more, to prevent "flooding", and waste.

With these and other objects in view the invention consists in certain novel features of construction as hereinafter shown and described and then specifically pointed out in the claim, and in the drawings illustrative of the preferred embodiment of the invention:—

Figure 1 is a front elevation of the improved device.

Fig. 2 is a vertical section on the line 2—2 of Fig. 1.

Fig 3 is a vertical section on the line 3—3 of Fig. 1.

Fig. 4 is a transverse section on the line 4—4 of Fig. 1.

Fig. 5 is a transverse section on the line 5—5 of Fig. 1.

Fig. 6 is a detail view.

The improved device comprises a casing or shell, represented as a whole at 10, and preferably open at the top and provided with a suitable detachable closure. The casing may be of any form or size and of any suitable material, but is preferably cylindrical, and of galvanized iron or the like.

Located in the lower part of the casing or shell 10 is a pan 11 for a relatively small supply of the water for the immediate use of the animals, and removably supported within the shell, for instance by chocks 12, is a relatively large tank 13 for the supply for replenishing the pan.

The tank 13 is supplied with a valve seat 14 to receive a valve 15 whose stem 16 is controlled by a float lever 17 having a float 18 at its free end extending into the pan and influenced by the water therein.

The valve seat member 14 includes a threaded portion to engage through the bottom of the tank and held by packing nuts, or the like, as shown in Fig. 6.

By this means the water in the pan is maintained at a uniform level, and automatically replenished only so fast as it is consumed.

Formed within the pan by a partition 19 is a compartment to receive a heating medium represented conventionally at 20, the wall of the casing 10 being provided with an opening to permit the insertion and removal of the heater.

The front of the heater is laterally enlarged as shown at 21 to form a closure to the opening, and the enlarged end provided with a register device represented at 22 to control the supply of air to the heater.

The partition 19 is exposed for its whole length to the wall of the heater and the heat thus utilized to its greatest extent for radiation into the water in the pan.

Formed through the sides of the casing above the line of the water in the pan 11, and at each side of the partition 19, are inlet openings 23 to provide access of the animals to the pan, each opening being provided with a guard hood 24 which reaches at its lower edge constantly into the water in the pan. The hoods thus serve the twofold purpose of preventing small animals from getting into the pan, and likewise preventing the escape of heat through the openings.

The animals can thus reach only the limited space beneath the hoods 24, but which is sufficient to supply their wants. The contents of the pan is thus protected and waste or fouling of the water prevented.

The improved device enables various kinds of fuel to be used in the heater, such as coal, wood, charcoal, and the like, and may be readily replenished as required, without disturbing the pan or the tank, and the tank may be replenished without disturbing the pan or the heater.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

A stock waterer comprising a casing, a pan within the casing and including an internal compartment with an opening in the wall of the casing communicating with the compartment, openings in the wall of the casing above the line of the water in the pan, a heater adapted to be inserted into the compartment through the opening into the same, protecting hoods over the lateral openings and constantly immersed at their lower edges in the water in the pan, a water tank supported within the casing, and means for supplying water from the tank to the pan.

In testimony whereof, I affix my signature hereto.

THOMAS RITCHIE.